United States Patent [19]

Taylor, Jr.

[11] 4,148,498
[45] Apr. 10, 1979

[54] TRAILER HITCH

[76] Inventor: Thomas A. Taylor, Jr., 212 S. 8th St., Chickasha, Okla. 73018

[21] Appl. No.: 842,626

[22] Filed: Oct. 17, 1977

[51] Int. Cl.² ............................................. B60D 1/18
[52] U.S. Cl. ................................. 280/482; 280/489; 280/490 R; 280/701; 280/724
[58] Field of Search .......... 280/483, 484, 489, 490 R, 280/482, 690, 697, 701, 715, 724, 725

[56] References Cited

U.S. PATENT DOCUMENTS

| 1,840,435 | 1/1932 | Davis | 280/489 |
| 2,486,605 | 11/1949 | Ladd | 280/489 |
| 3,554,578 | 12/1971 | Reed | 280/490 R |
| 4,000,911 | 1/1977 | Weber | 280/490 R |
| 4,046,274 | 9/1977 | Libersky | 280/482 |

FOREIGN PATENT DOCUMENTS 440876 8/1948 Italy ........................................ 280/714

Primary Examiner—Joseph F. Peters, Jr.
Assistant Examiner—R. Schrecengost
Attorney, Agent, or Firm—Robert M. Hessin

[57] ABSTRACT

Improvements in trailer hitch apparatus of the type used in heavy hauling, particularly for the transport of mobile home structures. The apparatus includes hydraulically elongatable tongue structure with height adjustable connector ball assembly as supported from the main rear truck frame structure; the apparatus is utilized in combination with a leaf-coil rear wheel spring structure that provides primary truck suspension. The trailer hitch is operable to support its towed structure in any of the open or closed elongated positions in order to better enable certain vehicle maneuvers, achieve optimum handling in emergency situations, and provide a more rugged, yet smoother riding connection to the towing vehicle.

6 Claims, 8 Drawing Figures

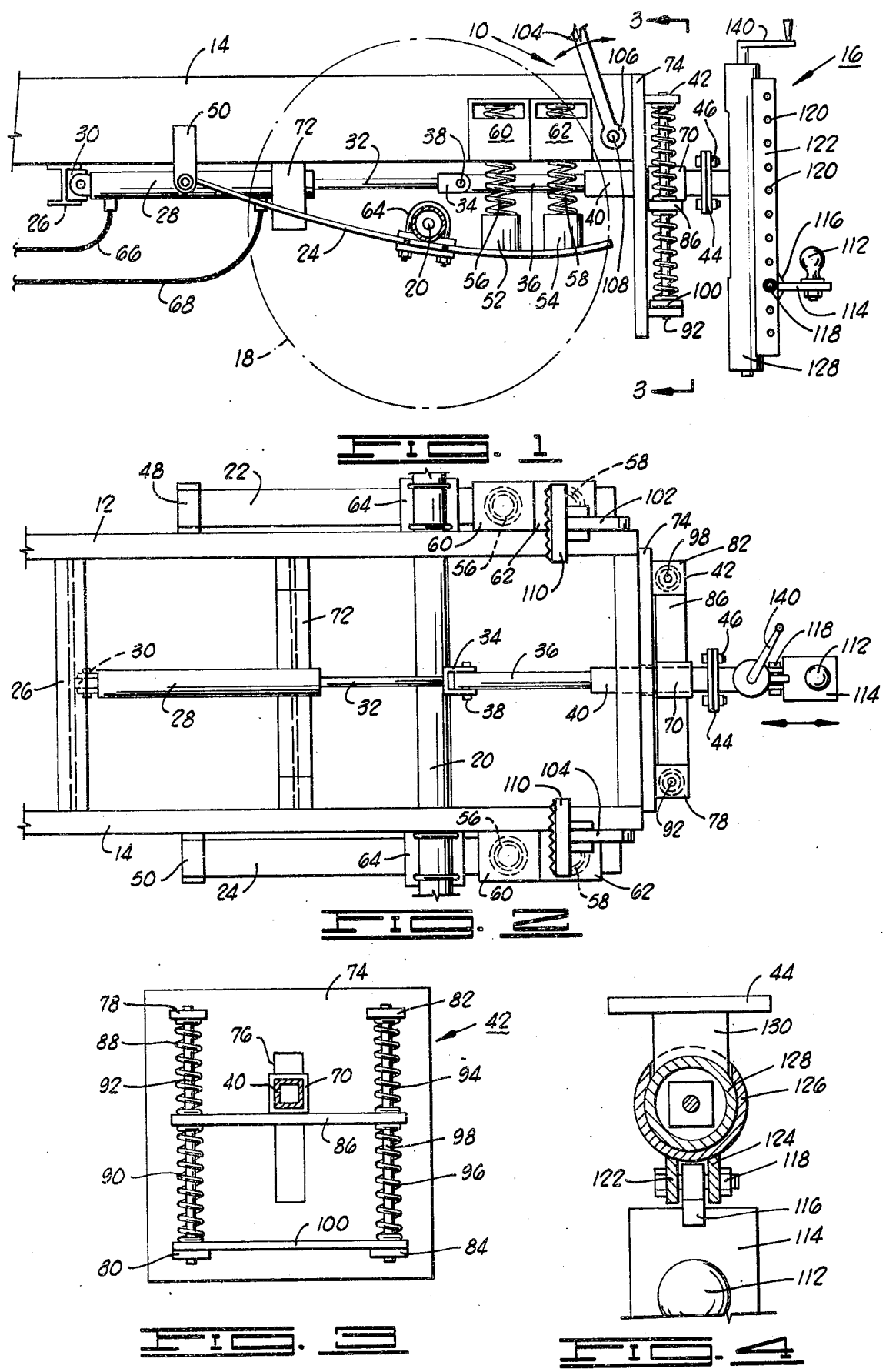

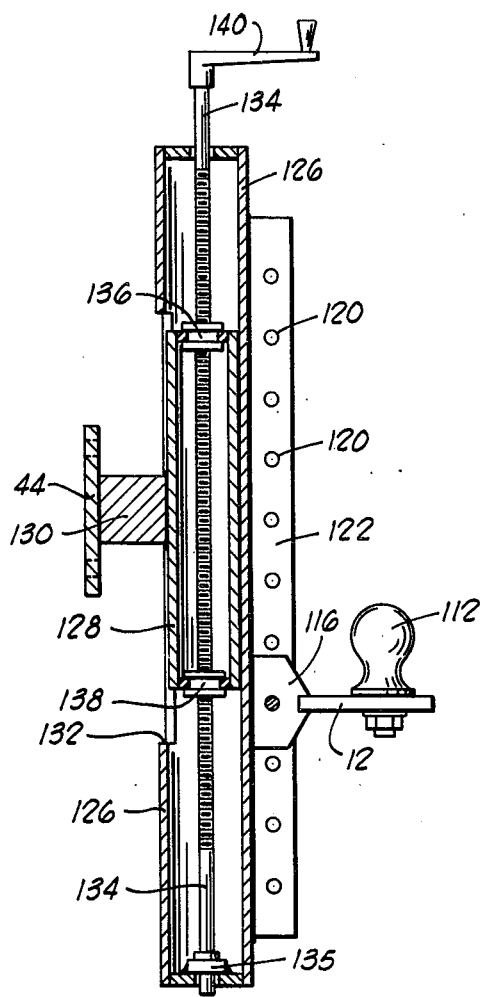
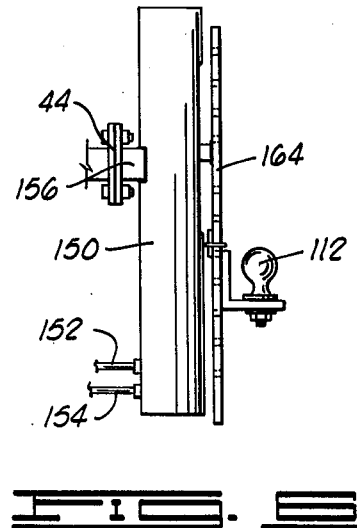
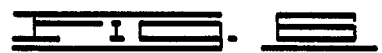
FIG. 6
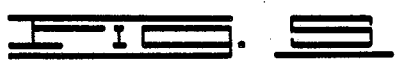
FIG. 5
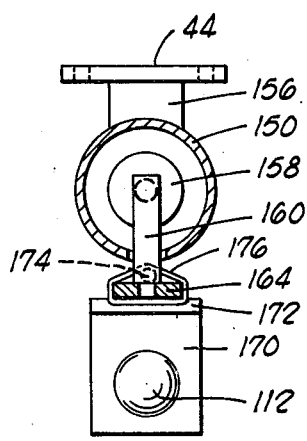
FIG. 8
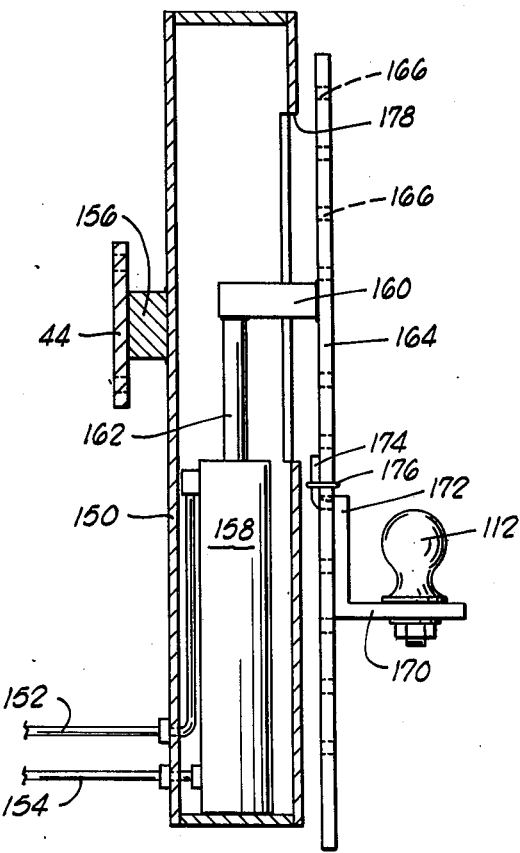
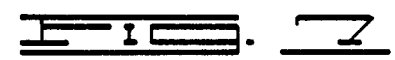
FIG. 7

TRAILER HITCH

BACKGROUND OF THE INVENTION

1. Field of the Invention

The invention relates generally to heavy trailer hitch devices and, more particularly, but not by way of limitation, it relates to improvements in trailer hitch structure for use in towing mobile home structures and the like.

2. Description of The Prior Art

The prior art includes numerous forms of towing structure for use in connecting a towing vehicle to a wheeled structure. In many instances such as tractor-trailer connections this takes the form of a generally horizontal fifth wheel structure, a type of towing hitch that has been widely used for a long number of years. The custom towing of mobile home structures, as is done in transport from manufacturer to point of sale, has utilized a different form of connector hitch in most cases, such structure being dictated by the frame and support structure available on the forward end of the towed structure and other considerations of safety and turn clearance that is exigent with wide trailing vehicles. Many such hitches utilize the simple ball and socket connector with the ball structure simply welded or fixed to a rear support position on the tractor or other towing vehicle.

SUMMARY OF THE INVENTION

The present invention contemplates an improved trailer hitch structure of a type which provides elongation control as well as height adjustment, thereby to enable a multiple of desirable tow functions. The hitch assembly is secured to the rear frame structure of a towing vehicle that includes a hydraulically elongatable tow bar supported through rearward spring guide structure to expose the ball assembly, a heighth adjustable structure. Rear wheel support of the towing vehicle is further carried out by means of a leaf-coil spring assembly, and the truck frame carries an adjustable boot leg assembly for use in certain emergency situations.

Therefore, it is an object of the present invention to provide a trailer hitch assembly which enables greater control and turning capability in operation of a tractor/trailer rig.

It is also an object of the present invention to provide a trailer hitch assembly for use in towing mobile homes and the like that offers greater support strength while still enabling a smoother riding trailer connection.

It is also an object of the invention to provide a trailer hitch assembly which enables optimum steering and turning capability in transport of mobile home structures and the like, i.e. structures having wider than normal road dimensions.

Finally, it is an object of the present invention to provide a trailer hitch assembly for moving trailer structures that has improved suspension, tension and towing length characteristics thereby to enable a more versatile form of towing connection.

Other objects and advantages of the invention will be evident from the following detailed description when read in conjunction with the accompanying drawings which illustrate the invention.

BRIEF DESCRIPTION OF THE DRAWINGS

FIG. 1 is a side elevation of the towing assembly of the present invention;

FIG. 2 is a top view of the assembly in FIG. 1;

FIG. 3 is a section taken along lines 3—3 of FIG. 1;

FIG. 4 is a section in top view of the adjustable ball assembly of the present invention;

FIG. 5 is a side view in section of the adjustable ball assembly;

FIG. 6 is a side elevation of an alternative form of adjustable ball assembly;

FIG. 7 is a side view in section of the adjustable ball assembly in FIG. 6; and

FIG. 8 is a top view in section of the adjustable ball assembly of FIG. 6.

DETAILED DESCRIPTION OF THE INVENTION

FIG. 1 illustrates a towing hitch assembly 10 as it is installed on a tractor rear frame assembly. Thus, and see also FIG. 2, the main longitudinal truck frame beams 12 and 14 provide the support of the towing hitch assembly 10 which, in turn, projects an adjustable ball assembly 16 rearwrd therefrom. The truck itself is shown only in partial view as it depicts rear wheel 18 and rear axle 20 as supported on laterally disposed leaf springs 22 and 24. The truck or tractor may be any of a number of conventional towing trucks of the type suitable for heavy duty operations, particularly as adapted for towing of mobile home and like structures.

An I-beam 26 is disposed transversely between truck frames 12 and 14 for the purpose of supporting a hydraulic cylinder 28 by means of the clevis connector 30 as weld-fastened to I-beam 26 centrally of truck frames 12 and 14. The hydraulic cylinder 28 then extends a piston rod end 32 rearward with a U-shape connector 34 secured as by welding thereon, the connector 34 being pivotally connected to a tow bar 36 by means of a pivot pin 38. A square tubing of selected strength is then welded to the rearward end of tow bar 36 to provide a draw tube 40 that is led through a rear guide assembly 42 to support the ball assembly 16 by means of a bolted flange 44 as secured by an equally-spaced circumferal array of bolts 46.

The rear axle 20 of the truck is supported by means of leaf springs 22 and 24 as are pivotally affixed to respective spring brackets 48 and 50 as secured in outward extension on opposite sides of truck frames 12 and 14. The rearward end of springs 22 and 24 are then supported by means of captive coil springs. Each of springs 22 and 24 has a pair of cylindrical coil seats 52, 54 welded thereon in longitudinal alignment, and these in turn receive coil springs 56 and 58 for retention within respective captive boxes 60 and 62 as welded in juxtaposition on the outer side of truck frames 12 and 14. Thus, the rear axle 20 is then affixed on top of leaf springs 22 and 24 by means of a plurality of U-bolt clamps 64 and the rear truck frame is then supported on the combination leaf-coil springs during earth contact of rear wheels 18. Conventional spring retainer assemblies would also be utilized to prevent total disassembly of the leaf-coil spring assemblies during raising of the rear wheels out of ground contact as might be necessitated for maintenance and the like.

The hydraulic cylinder 28 as activated by hydraulic lines 66 and 68 from the hydraulic supply system of the truck vehicle. It is desirable that the hydraulic cylinder 28 have a stroke of about 2½ feet whereupon the tow bar 36 and square tube extension 40 are reciprocally movable through a longitudinal guide way 70 as supported in rear guide assembly 42. The forward end of the hydraulic cylinder 28 may be supported by a suitable transverse U-frame 72 as may be welded between truck frames 12 and 14.

As shown in FIG. 3, the rear guide assembly 42 consists of a heavy gauge plate 74 as welded across the rear end of the truck frames 12 and 14 to extend downward therefrom. Back plate 74 includes a central slot 76 through which square tube 40 passes, such slot 76 allowing up and down motion but preventing any sideways motion. Flanges 78, 80, 82 and 84 are then formed on the rearward phase of back plate 74 in order to support a bearing plate 86 and guide way 70 under spring tension. Thus, left springs 88 and 90 are utilized above and below bearing plate 86 and maintain an alignment by means of a guide rod 92 secured vertically therethrough and in captive retention with flanges 78 and 80. In like manner, the right side of back plate assembly 42 includes upper and lower coil springs 94 and 96 with the vertical retaining rod 98 disposed therethrough so that the bearing plate 86 is resiliently retained in a horizontal attitude to support the guide tube 70 and tube 40 passing therethrough to ball assembly 16. A transverse plate 100 is also provided with vertical guide rods 92 and 98 affixed therethrough in order to provide transverse support to the guide structure.

A pair of adjustable boot leg support shoes 102 and 104 are pivotally supported on each side of truck frames 12 and 14. Thus, as shown in FIG. 1, support shoe 104 is pivotally supported by means of support eye 106 and a pivot post 108 formed as by welding to the outer rear side of truck frame 14. Support shoe 14 carries a pivotally connected shoe 110 thereon for purposes of ground contact in a manner as will be described further below. The opposite support shoe is identically constructed and pivotally supported to the outside surface of truck frame 12 by means of a rear pivot post 108.

The adjustable ball assembly 16, as supported through bolted flange 44 for longitudinally extensible positioning upon actuation of hydraulic cylinder 28, is a screw jack assembly or the like having requisite height adjustability features, as is shown more clearly with reference to FIGS. 4 and 5. Thus, the connector ball 112 is supported by a plate 114 having a vertical plate 116 which is connectable by means of a bolt 118 to a selected transverse hole 120 of jack plates 122 and 124. As shown in FIG. 4, jack plates 122 and 124 are welded in parallel to a vertical tube 126 that is slidable in relation to an inner, concentric tube 128 supported in weldment to a tube section 130 and flange 44.

Thus, screw power as applied along the axial bolt enables reciprocation of tube 126 relative to tube 128 to adjust the height of plate 114 and connector ball 112. As shown in FIG. 5, the outer cylinder 126 includes a vertical slot 132 that is wide enough to prevent entry of tube 130 therethrough in a slidable relationship. A jack screw 134 as rotatably retained by a journal 135 welded in the bottom of tube 126 is led through upper and lower threaded bearings 136 and 138 as secured within the ends of inner tube 128. Manipulation of jack handle 140 turning jack screw 134 then results in movement of inner tube 138 relative to outer tube 126, and since inner tube 128 is positioned through rear guide assembly 42, the ball 112 will be selectively adjusted to ground level.

FIGS. 6, 7 and 8 illustrate an alternative form of screw jack assembly that may be used if so desired. Thus, hydraulic actuation may be employed to actuate an assembly 150 by means of hydraulic lines 152 and 154 from the vehicle supply system. The cylinder assembly 150 may be weld affixed by means of a tubing joint 156 to the support flange 44. A hydraulic cylinder 158 may be suitably seated within cylinder assembly 150 to extend an operative arm 160 from piston rod end 162 into engagement with a vertically movable ball hanger 164. Ball hanger 164 may also include a plurality of vertically aligned equally-spaced holes 166.

The connector ball 112 is rigidly affixed to an angle bracket 170 which includes a vertical flange 172 and further extending pawl 174. The pawl 174 may then be inserted through a selected one of holes 166, depending upon desired connector ball height, whereupon a spring clip 176 or the like will serve to retain the connector ball assembly in operative position. The cylinder assembly 150 includes a rearward oriented vertical slot 178 of selected height and width sufficient to accommodate movable passage through of operative arm 160. In practice, other conventional forms of support may be utilized to take the strain off of the piston rod 162 under load. Conventionally, this may take the form of enlarged bearing portion formed on the inner end of operative arm 160 for purposes of bearing against the inner walls of cylinder assembly 150 along the slot 178.

In operation, it is first necessary to position ball 112 at a level suitable for picking up and towing the prospective load, and this is done by selection of the proper one of holes 120 along plates 122 and 124 with securing bolt 118. Operation of the crank arm 140 will then enable a vertical stroke of approximately one foot movement of the connector ball 112 so that the load can then be raised up to proper towing level. Actuation of hydraulic cylinder 128 will then retract the piston rod arm 32 thereby to draw rod 36 and tube 40 inward and bring the ball assembly 16 to its closeup position adjacent rear guide assembly 42.

During towing, the truck frame is well supported by the leaf springs 22 and 24 and their respective associated coil springs 56 and 58, and the tow bar is further supported by the resilient spring seating of bearing plate 86 in the rear guide assembly 42 in such manner that a much smoother tow interconnection is achieved. The total spring support of the interconnection eliminates much interactive force as between tractor and towed vehicle.

Oftentimes it is desirable to achieve a particular turning radius in order to maneuver within a receiving lot or to proceed through a tight turn along the route of transport. This condition is an especial problem with respect to towing wider-than-normal mobile homes and the like, because the forward wall of the mobile home structure will oftentimes interfere with the rear truck wheels and frame upon attempting a very sharp turn. This problem may be overcome by actuating hydraulic cylinders 29 to extend the tow arm or rod end 32 and trailing structure so that the ball assembly 16 is carried at a more rearward position, e.g., from 1½ to 2½ feet rearward. Then, the truck can minipulate a tight turn and regain his proper route or position so that hydraulic cylinder 28 can once again be actuated to close up the towing arm distance and towing can proceed in normal manner.

The boot leg support arms 102 and 104 provide yet another emergency aid in that in certain situations where truck, trailer and/or both are mired in mud, the boot leg supports 102 and 104 can be swung rearwardly and down until the respective support feet 110 engage the ground, whereupon actuation of the hydraulic cylinder through its full stroke movement will enable crablike movement of one vehicle relative to the other until clear of the situation. Thus, for example, where truck wheels 18 lose traction on an uphill grade, supports 102 and 104 may be dropped to brace rearward at a position of full open stroke of hydraulic cylinder 28 whereupon the cylinder can be retracted to hydraulically move the towed vehicle forward for the length of the stroke. Repetition of this procedure for the necessary distance will then free the tractor and towed vehicle to once again proceed along its route.

The foregoing discloses a novel trailer hitch assembly which has desirable attributes of adjustability and which provides a smoother, yet more positive towing interconnection for movement of large wheeled assemblies. The invention is particularly desirable in the modern day practice of transport of mobile home assemblies and it provides a greater degree of control and reliability in the towing operation.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A trailer hitch for mounting on a truck having first and second longitudinal, rear frame members, comprising:
    back plate means rigidly secured to the rear end of said first and second frame members, said back plate means having a vertical slot generally centrally thereof;
    first and second spring members rigidly secured to said back plate means on opposite sides of said slot to provide spring movement parallel to the vertical direction of said slot; and
    bearing plate means vertically resiliently supported intermediate said first and second spring members;
    hydraulically extendible tow bar means, a first end of said tow bar means being rigidly secured to said frame members, a second end of said tow bar means being extendible rearward in parallel alignment with said frame members through said vertical slot to be supported on said bearing plate means; and
    ball assembly means, including a connector ball, that is rigidly secured to the second end of said tow bar means to place said connector ball in operative towing position.

2. A trailer hitch as set forth in claim 1 wherein said tow bar means comprises:
    hydraulic cylinder means having one end secured to said frame means and extending a piston rod end in parallel alignment with said frame means generally centrally thereof;
    rigid tubular means pivotally secured to said piston rod end to extend rearward as supported by said bearing means.

3. A trailer hitch as set forth in claim 1 wherein said ball assembly means comprises:
    jack screw means connected to the second end of said tow bar means and being manually operable to extend a movable support cylinder reciprocally in the vertical direction;
    connector ball securing means rigidly secured along said movable cylinder means and including more than one position for receiving said connector ball in operative engagement.

4. A trailer hitch as set forth in claim 2 wherein said ball assembly means comprises:
    jack screw means connected to the second end of said tow bar means and being manually operable to extend a movable support cylinder reciprocally in the vertical direction;
    connector ball securing means rigidly secured along said movable cylinder means and including more than one position for receiving said connector ball in operative engagement.

5. A trailer hitch as set for in claim 2 wherein said ball assembly means comprises:
    hydraulic cylinder means connected to said rod means rear end and controllably extending a rod end in the vertical direction;
    hanger plate means supported by said rod end for parallel movement therewith; and
    hanger means supporting said connector ball and being selectively connectable to said hanger plate means at more than one vertical position.

6. In combination, a suspension assembly for a truck having first and second longitudinal, rear frame members and a trailer hitch assembly for coaction therewith, comprising:
    first and second leaf spring members connected to extend rearward and below said first and second longitudinal frame members to support the rear axle of said truck in rigid connection thereon;
    first and second coil spring means secured to the top of said first and second leaf spring means rearward of said rear axle affixure;
    first and second spring retention means disposed on said first and second frame members and receiving said first and second coil springs in captive retention;
    back plate means rigidly secured to the rear end of said first and second frame members; said back plate means having a vertical slot disposed generally centrally thereof;
    first and second spring members secured to said back plate means on opposite sides of said vertical slot;
    bearing plate means vertically resiliently supported intermediate said first and second spring members;
    hydraulically extendible tow bar means, a first end of said tow bar means being rigidly secured to said first and second frame members, a second end of said tow bar means being extendible rearward through said vertical slot to be supported by said bearing plate means; and
    ball assembly means, including a connector ball, said ball assembly means being rigidly secured to the second end of said tow bar means to place said connector ball in operative towing position.

* * * * *